(12) United States Patent
Thomas et al.

(10) Patent No.: US 8,090,636 B2
(45) Date of Patent: Jan. 3, 2012

(54) VALUING MODEL OPTION CONTRACTS

(76) Inventors: Bruce Bradford Thomas, Trumbull, CT (US); Billy Page Flake, Windsor, CT (US)

( * ) Notice: Subject to any disclaimer, the term of this patent is extended or adjusted under 35 U.S.C. 154(b) by 710 days.

(21) Appl. No.: 12/220,894

(22) Filed: Jul. 30, 2008

(65) Prior Publication Data

US 2010/0030600 A1    Feb. 4, 2010

(51) Int. Cl.
     *G06Q 40/00*    (2006.01)
(52) U.S. Cl. .............................. 705/35; 705/36 R
(58) Field of Classification Search ................. 705/35, 705/36
See application file for complete search history.

(56) References Cited

U.S. PATENT DOCUMENTS

| | | | | |
|---|---|---|---|---|
| 2002/0073007 | A1* | 6/2002 | Ayache | 705/36 |
| 2003/0023525 | A1* | 1/2003 | Chen | 705/35 |
| 2006/0143099 | A1* | 6/2006 | Partlow et al. | 705/35 |

OTHER PUBLICATIONS

U.S. Appl. No. 10/757,933, filed Jul. 21, 2005, Bruce Bradford Thomas.
U.S. Appl. No. 12/008,581, filed May 8, 2008, Bruce Bradford Thomas.

* cited by examiner

*Primary Examiner* — Charles Kyle
*Assistant Examiner* — Siegfried E Chencinski

(57) ABSTRACT

A method for determining the theoretical value of a Model Option contract.

6 Claims, 5 Drawing Sheets

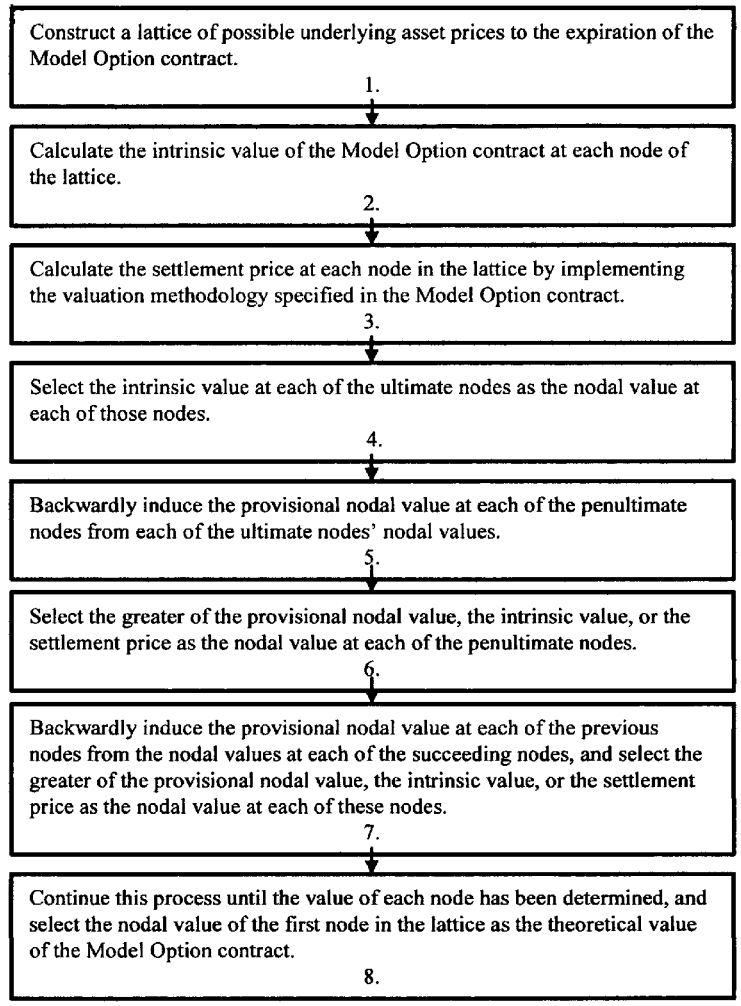

```
┌─────────────────────────────────────────────────────────────────────────┐
│ Construct a lattice of possible underlying asset prices to the          │
│ expiration of the Model Option contract.                                │
│                                  1.                                     │
└─────────────────────────────────────────────────────────────────────────┘
                                   ↓
┌─────────────────────────────────────────────────────────────────────────┐
│ Calculate the intrinsic value of the Model Option contract at each      │
│ node of the lattice.                                                    │
│                                  2.                                     │
└─────────────────────────────────────────────────────────────────────────┘
                                   ↓
┌─────────────────────────────────────────────────────────────────────────┐
│ Calculate the settlement price at each node in the lattice by           │
│ implementing the valuation methodology specified in the Model Option    │
│ contract.                                                               │
│                                  3.                                     │
└─────────────────────────────────────────────────────────────────────────┘
                                   ↓
┌─────────────────────────────────────────────────────────────────────────┐
│ Select the intrinsic value at each of the ultimate nodes as the nodal   │
│ value at each of those nodes.                                           │
│                                  4.                                     │
└─────────────────────────────────────────────────────────────────────────┘
                                   ↓
┌─────────────────────────────────────────────────────────────────────────┐
│ Backwardly induce the provisional nodal value at each of the            │
│ penultimate nodes from each of the ultimate nodes' nodal values.        │
│                                  5.                                     │
└─────────────────────────────────────────────────────────────────────────┘
                                   ↓
┌─────────────────────────────────────────────────────────────────────────┐
│ Select the greater of the provisional nodal value, the intrinsic value, │
│ or the settlement price as the nodal value at each of the penultimate   │
│ nodes.                                                                  │
│                                  6.                                     │
└─────────────────────────────────────────────────────────────────────────┘
                                   ↓
┌─────────────────────────────────────────────────────────────────────────┐
│ Backwardly induce the provisional nodal value at each of the previous   │
│ nodes from the nodal values at each of the succeeding nodes, and select │
│ the greater of the provisional nodal value, the intrinsic value, or the │
│ settlement price as the nodal value at each of these nodes.             │
│                                  7.                                     │
└─────────────────────────────────────────────────────────────────────────┘
                                   ↓
┌─────────────────────────────────────────────────────────────────────────┐
│ Continue this process until the value of each node has been determined, │
│ and select the nodal value of the first node in the lattice as the      │
│ theoretical value of the Model Option contract.                         │
│                                  8.                                     │
└─────────────────────────────────────────────────────────────────────────┘
```

FIG. 1

Binomial Tree Valuation Tool for Model Options

This valuation tool employs a binomial tree. The symbols for the parameters used in the tool are listed below.

S  = stock price
X = strike price per option contract
r  = risk-free interest rate
r* = risk-free interest rate as specified in Model Option Contract
b  = cost of carry (r-dividend rate on S)
b* = cost of carry as specified in Model Option Contract
T  = time to expiration date of the option contract
σ  = volatility of relative price change of the underlying stock price
σ* = volatility as specified in Model Option Contract
n  = number of time steps in the binomial tree
z  = 1 for calls, -1 for puts - as specified in Model Option Contract
$P_{j,i}$ = option value at the j,i node of the binomial tree
VM* = the valuation method specified in the option contract for determining the amount of the settlement price at future points in time, e.g. Black Scholes.

The valuation tool first determines the option payoff $P_{n,i}$ for i = 0,n at each of n+1 stock prices on the expiration date of the option as the intrinsic value at each stock price. The tool then proceeds by backward induction:

$$P_{j,i} = \text{Max} \left\{ VM^* \left[ z, \left( Se^{i\sigma\sqrt{T/n}} e^{-|i-j|\sigma\sqrt{T/n}} \right), X, (n-j)T/n, r^*, b^*, \sigma^* \right], \right.$$

$$\left[ \left( \frac{e^{bT/n} - e^{-\sigma\sqrt{T/n}}}{e^{\sigma\sqrt{T/n}} - e^{-\sigma\sqrt{T/n}}} \right) P_{j+1, i+1} + \left( 1 - \frac{e^{bT/n} - e^{-\sigma\sqrt{T/n}}}{e^{\sigma\sqrt{T/n}} - e^{-\sigma\sqrt{T/n}}} \right) P_{j+1, i} \right] e^{-rT/n},$$

$$\left. z \left( Se^{i\sigma\sqrt{T/n}} e^{-|i-j|\sigma\sqrt{T/n}} - X \right) \right\}$$

For i = 0,j and j = n - 1,0.
$P_{0,0}$ is the option value on the valuation date.

FIG. 2

Option Valuation Pricing Model for Model Options

Call ▽

American ▽

| 1 | Asset price ( S ) | 99.00 |
|---|---|---|
| | Strike price ( X ) | 100.00 |
| | Time to maturity ( T ) | 0.25 |
| | Risk-free interest rate ( r ) | 4.00% |
| | Cost of carry ( b ) | -4.00% |
| | Volatility ( $\sigma$ ) | 30.00% |
| | Number of time steps ( n ) | 60 |

| 2 | Value of traditional Option using Binomial Model | 5.0249 |
|---|---|---|

| 3 | Specified risk-free interest rate ( $r^*$ ) | 4.00% |
|---|---|---|
| | Specified cost of carry ( $b^*$ ) | -4.00% |
| | Specified volatility ( $\sigma^*$ ) | 20.00% |

| 4 | Settlement price as determined by Bjerksund Stensland Approximation | 3.0454 |
|---|---|---|
| | Value of Model Option when the settlement price is determined using Bjerksund Stensland Approximation | 5.0254 |

| 5 | Settlement Price as determined using the Binomial Model | 3.0951 |
|---|---|---|
| | Value of Model Option when the settlement price is determined using the Binomial Model | 5.0254 |

| 6 | Settlement price as determined using the Generalized Black and Scholes Model | 3.0045 |
|---|---|---|
| | Value of Model Option when the settlement price is determined using the Generalized Black and Scholes Model | 5.0254 |

FIG. 3

Trinomial Tree Valuation Tool for Model Options

This valuation tool employs a trinomial tree. The symbols for the parameters used in the tool are the same as for the binomial tree valuation tool.

The valuation tool first determines the up jump size (u) and the down jump size (d):

$$u = e^{\sigma\sqrt{\frac{2 \cdot T}{n}}}$$

$$d = e^{-\sigma\sqrt{\frac{2 \cdot T}{n}}}$$

These values are used to determine value of the underlying stock at each node:

$$S_{j,i} = S \cdot u^{\max(i-j,0)} \cdot d^{\max(j-i,0)}$$

And the up jump probability (up), the down jump probability (dp) and the no jump probability (np):

$$up = \left[\frac{e^{\frac{b \cdot T}{2 \cdot n}} - \sqrt{d}}{\sqrt{u} - \sqrt{d}}\right]^2$$

$$dp = \left[\frac{\sqrt{u} - e^{\frac{b \cdot T}{2 \cdot n}}}{\sqrt{u} - \sqrt{d}}\right]^2$$

$$np = \frac{2 \cdot e^{\frac{b \cdot T}{2 \cdot n}} \cdot \left(\sqrt{u} + \sqrt{d} - e^{\frac{b \cdot T}{2 \cdot n}} - e^{\frac{-b \cdot T}{2 \cdot n}}\right)}{\left(\sqrt{u} - \sqrt{d}\right)^2}$$

FIG. 4a

The tool can now determine the option payoff $P_{n,i}$ for $i = 0,2n$ for each of the $2n+1$ stock prices on the expiration date of the option as the intrinsic value at each stock price. The tool then proceeds to calculate the option payoff at earlier nodes by backward induction:

$$P_{j,i} = \text{Max} \left\{ \text{VM*}\left[ Z, S_{j,i}, X, (n-j)T/n, r^*, b^*, \sigma^* \right], \right.$$
$$\left[ \text{up} \cdot P_{j+1, i+2}, + \text{np} \cdot P_{j+1, i+1} + \text{dp} \cdot P_{j+1, i} \right] e^{-rT/n},$$
$$\left. Z(S_{j,i} - X) \right\}$$

For $i = 0,2j$ and $j = n-1,0$.

$P_{0,0}$ is the option value on the valuation date.

FIG. 4b

VALUING MODEL OPTION CONTRACTS

CROSS-REFERENCE TO RELATED APPLICATIONS

This application is related to nonprovisional patent application Ser. No. 10/757,933 filed Jan. 15, 2004 entitled "Model Options" and nonprovisional CIP patent application Ser. No. 12/008,581 filed Jan. 11, 2008 entitled "Model Option Contracts" both of which were by Bruce B. Thomas, one of the present inventors.

FEDERALLY SPONSORED RESEARCH

Not Applicable

SEQUENCE LISTING OR PROGRAM

Not Applicable

BACKGROUND OF THE INVENTION

1. Field of Invention

This invention relates to valuing option contracts.

2. Background of the Invention

Model Option Contracts

A Model Option contract (also referred to as a "Model Option") is a new type of option contract that gives the holder the right to settle the contract by selling it back to the option seller at a price determined by a valuation methodology that is specified in the contract. In effect, this is a way of embedding a put option into an option contract since the option holder has the right to put the option contract back to the option seller for a cash value via a settlement right that is specified in the option contract.

Constructing a Model Option contract requires specification in the contract of: basic option terms such as whether it is a put or call, the underlying asset, a strike price, an expiration date or contract term, and the type of exercise that is allowed (American, European, etc.); the additional right to settle the contract by selling it back to the option seller; and a valuation methodology that will be used to determine the value of this additional right.

The additional right to settle the contract by selling it back to the option seller during the life of the contract may be structured in countless ways. A Model Option contract may give the option holder the right to sell the contract back at a preset point or points. It may grant this right continuously over the life of the contract. A Model Option contract may give this additional settlement right continuously over the life of the contract unless certain specified events occur. Alternatively, the contract may give this right only upon the occurrence of certain specified conditions.

In the case of options used as compensation, personal conditions pertaining to the holder might be specified such as age, disability, loss of a loved one, etc. Alternatively, certain corporate conditions might trigger this right or prevent the holder from exercising this right including the possibility of a hostile takeover, the company's bankruptcy filing, or the advent of some other financial event. Other more general conditions that might be used to trigger this additional settlement right or nullify it would include changes in market indicia such as volume of trades, interest rate changes, etc.

The valuation methodology employed in a Model Option must include a description of an option pricing model (such as the Black and Scholes, the binomial, etc.) and how the input values necessary to run the option pricing model will be derived (i.e., the risk-free rate of interest, the volatility of the underlying asset price, the dividend rate, etc.). An information system is necessary to implement the valuation methodology given the complexity of the mathematical calculations employed and the need for accuracy and computational speed.

Model Option contracts can be used in many different ways in conjunction with the market for traditional options or even when there is no market for traditional options on the underlying asset or over a specific time horizon.

Despite the many benefits of using Model Option contracts, users need a method for valuing these contracts that makes sense from a theoretical perspective and is also practical enough to permit real time and continuous usage.

OBJECTS AND ADVANTAGES

The object of the invention is a method that enables companies and individuals to value Model Option contracts. This method is theoretically sound and is practical enough to enable anyone with a limited understanding of options to value a Model Option contract. This method can be used to value Model Options that are traded on an exchange, used as compensation for services performed, or serve as an exchange of value between parties in any other situation.

Given that Model Option contracts convey an additional right to settle ("settlement right") by selling said contract back to the option seller or grantor (in the case of compensation options) at a price that is determined by the specified valuation methodology, it is theoretically improper and inaccurate to use any of the existing option pricing models to value these contracts. By definition, a Model Option contract conveys something more than a comparable option that does not contain this settlement right (i.e., a traditional option).

Thus, it is logical that a Model Option contract will always be worth at least as much as a comparable traditional option and may contain some additional value, depending on the value of this additional right to settle. The nonprovisional patent application entitled "Model Option contracts", by the present inventor, teaches a method for structuring a Model Option contract and determining a settlement price for such a contract. However, it does not teach a method for developing a theoretical value for a Model Option contract.

One can determine the settlement price of a Model Option contract by following the specified valuation methodology embedded in said contract. However, determining the settlement price is not the same as calculating the value of the settlement right or the extra value that the contract has that is derived from the settlement right.

One can use existing option pricing models to determine a theoretically correct valuation of a Model Option assuming that it contains no cash settlement right, i.e. that it is a traditional option. However, neither of these approaches accurately calculate the theoretical value for a Model Option. The present invention enables one to determine the theoretical value of the Model Option contract as a whole, which may vary significantly from the settlement price or from the theoretical value of a traditional option with the same basic option terms.

Without a theoretically sound understanding of the value of Model Option contracts, institutions may be reluctant to trade these contracts. The present invention helps Model Option users to record theoretically correct values for Model Options in their books and records and to manage the risk associated with these contracts.

SUMMARY OF THE INVENTION

The present invention is a method for calculating a theoretically correct value for a Model Option contract. This method requires an option pricing model that is designed to calculate the value of a Model Option and an information system that will be used to calculate such a value. Given the complexity of the calculations involved and the need for accuracy and speed, an information system is required to implement this method.

A Model Option contract can be decoupled into two parts: its "traditional option value component" and its "settlement value component". The traditional option value component is the value that a Model Option contract would have if it does not have a settlement value component or if the settlement value component is worthless. This value can be determined by applying an existing option pricing model to a Model Option in the same way one would value a traditional option.

Under certain conditions, the traditional option value component of a Model Option contract may be so small that all of the value of the contract is derived from its settlement value component. This could happen, for example, if there were a substantial difference between the volatility that would be used to determine the traditional option value component and the specified volatility used to determine the settlement price. This would also be the case if the Model Option contract were structured so that it could never be exercised in the traditional way by delivery of the underlying asset.

Conversely, the settlement value component of a Model Option contract may be so small that all of the value of the contract is derived from its traditional option value component. This condition could exist because of significant differences between the input values that would be used to determine the traditional option value component and the settlement value component, or it could result from limitations being placed on the settlement right of the Model Option contract.

In summary, a Model Option contract can not be worth less than either its traditional option value component or its settlement value component. The theoretically correct value of a Model Option contract is the present value of the greater of its settlement value component or its traditional option value component at each future point in time until the contract expires.

BRIEF DESCRIPTION OF THE DRAWINGS

FIG. 1 describes the steps necessary to calculate a theoretically correct value for a Model Option contract.

FIG. 2 illustrates a mathematical formula that can be derived from the process described in FIG. 1 to calculate a theoretically correct value for a Model Option contract using a binomial approach.

FIG. 3 provides an example of how the mathematical formula in FIG. 3 can be embodied in a computer program that can calculate a theoretically correct value for a Model Option contract.

FIG. 4 illustrates a mathematical formula that can be derived from the process described in FIG. 1 to calculate a theoretically correct value for a Model Option contract using a trinomial approach.

DETAILED DESCRIPTION—FIGS. 1-5

Preferred Embodiments

The following detailed description discloses various embodiments and features of the invention. These embodiments and features are meant to be exemplary and not limiting.

Definitions

The definitions provided below are to be applied to their respective terms or phrases as used herein unless the context of a given particular use of a given term or phrase clearly indicates otherwise.

The term "contract owner" refers to the owner of the Model Option contract (also referred to as a "Model Option").

The term "right to settle" and "settlement right" refer to the Model Option contract owner's right to settle the contract by selling it back to the party that sold them the Model Option contract.

The term "settlement price" refers to the price at which the Model Option contract owner may settle the contract by selling it back to the option seller.

The term "intrinsic value" refers to the value a Model Option contract has as a result of its strike price being different than the price of the underlying asset(s) on which the option contract is based. The intrinsic value of a Model Option contract cannot be less than zero. For a call option, the intrinsic value is the amount by which the current underlying asset price exceeds the strike or exercise price. For a put option, the intrinsic value is the amount by which the strike price exceeds the current price of the underlying asset.

The term "basic option terms" refers to the terms that must be included in an option contract. These terms are a standard part of any option contract and include such things as whether the option is a put or call, a description of the underlying asset, the strike price, the expiration date or contract term, and the holder's ability to exercise the option (American, European, Bermudian, etc.). Basic option terms may be described in the Model Option contract itself or might include such specification by referencing the terms of another option contract.

The term "specified valuation methodology" refers to the valuation methodology that is described in a Model Option contract and used to determine the settlement price. The specified valuation methodology included in a Model Option consists of a description of an option pricing model and a description of how each of the input values, necessary to run the option pricing model, will be derived.

The term "option pricing model" refers to any recognized and accepted mathematical model that is used to develop the theoretical value of an option. Black and Scholes, Whaley, Binomial Lattice, Trinomial Trees, and Merton's Jump Diffusion are examples of option pricing models that are used to value traditional options. At least one option pricing model must be specified in a Model Option contract, as such a model is used to determine the settlement price of the contract. More than one option pricing model may be specified in a Model Option contract so long as it is clear under what circumstances each model will be used and how each model will be used to determine the settlement price.

The term "input values" refers to each of the values that that are required to run the option pricing model that must also be included in the specified valuation methodology such as the risk-free rate of interest, the volatility of the underlying asset price, the dividend rate, etc. These values would not be determinable from the Model Option contract wording if it were not for the description in the specified valuation methodology. The other values necessary to run the option pricing model are obvious based on the contract wording that specifies the basic option terms.

The term "node" refers to a branch on a mathematical tree constructed to value a Model Option contract.

The term "nodal value" refers to the value of a Model Option contract has at a particular node on a mathematical tree constructed to value a Model Option contract. The nodal value at each node at expiration is the intrinsic value. The nodal value for each node prior to expiration is the greater of the intrinsic value, the provisional traditional option value, or the settlement price.

The term "provisional nodal value" refers to a value derived from the use of backward induction to develop the Model Option contract's theoretical value at a particular node in the lattice or tree from the succeeding nodal values.

The term "ultimate nodes" refers to the last nodes in the lattice and represent the expiration of the option, from a time perspective.

The term "penultimate nodes" refers to the nodes one time-step before the ultimate nodes in the lattice.

The term "first node" refers to the first node in the lattice and represents the present time.

The term "information system" refers to one or more computers, servers, input devices, output devices, data storage devices, telecommunications equipment and software. Information systems may communicate with other information systems via telecommunications means, such as the Internet. Information systems may also communicate with persons via input/output devices. Persons may communicate with other persons using information systems.

The term "compensation option" refers to an option that a company grants in exchange for work or other services.

The term "company" refers to any organization that is set up to make profits or to help other entities to make profits and includes stock companies, partnerships, limited liability companies, etc.

The term "exchange" refers to a place or mechanism that facilitates the trading of options. An exchange can be a physical location or an electronic mechanism where trading takes place or where information about trading is provided. An exchange may act as counterparty between buyers and sellers or it can merely provide information that enables buyers and sellers to trade directly with one another.

Method for Valuing a Model Option Contract

FIG. 1 describes a methodology and step-by-step approach for determining a theoretically correct value for a Model Option contract.

This methodology uses a discrete-time framework to follow the price of the option's underlying asset via a lattice or "tree", for a given number of time steps between the valuation date and the expiration of the Model Option contract. Each node in the lattice represents a possible price of the underlying asset at a particular point in time. This option valuation methodology is iterative. It begins by generating a lattice of the underlying asset's value until expiration. One calculates the Model Option contract's value at each of the expiration nodes and then works progressively backwards through the lattice to the present time, when there is only one node. The value of the option at this node, i.e. the "nodal value" at this node, is the current theoretical value of the Model Option contract.

Any theoretically correct approach to constructing the lattice can be used in this method to generate the value of the underlying asset until expiration and to backwardly induce option values at previous nodes, so long as these formulas are consistently applied. Thus, binomial and trinomial lattice construction methods can be used in this method so long as once a particular formula is selected it is used consistently thereafter.

First, one creates a lattice of possible prices for the underlying asset to the expiration of the Model Option contract 1. One may select a binomial, trinomial, or some other type of lattice method to accomplish this task. For example, to create a binomial lattice one might use the Cox, Ross, Rubinstein method.

The intrinsic value of the Model Option contract is calculated at each node of the lattice 2. For a call option, this is the amount by which the underlying asset price exceeds the strike or exercise price of the option contract. For a put option, the intrinsic value is the amount by which the strike or exercise price of the option exceeds the price of the underlying asset.

The settlement price is calculated at each node in the lattice by implementing the valuation methodology specified in the Model Option contract 3.

Next, the intrinsic value at each of the ultimate nodes is selected as the nodal value at each of those nodes 4. One then backwardly induces (using a process of backward induction) the provisional nodal value at each of the penultimate nodes from the nodal values at each of the ultimate nodes.

The greater of the provisional nodal value, the intrinsic value, or the settlement price is selected as the nodal value for each of the penultimate nodes 6.

Next, one backwardly induces the provisional nodal value at each of the previous nodes from the nodal values at each of the succeeding nodes, and selects the greater of the provisional nodal value, the intrinsic value, or the settlement price as the nodal value for each of these nodes 7.

This process continues until the value of each node has been determined, at which point, the nodal value of the first node in the lattice is selected as the theoretical value of the Model Option contract 8.

Due to the number of calculations involved and the need for computational accuracy and speed, an information system must be employed to implement this method.

Option Pricing Model for a Model Option Contract Using a Binomial Approach

A mathematical formula that implements the method described in FIG. 1 using a binomial approach is shown in FIG. 2. This formula can be used to calculate a theoretically correct value for a Model Option contract with a common stock as the asset underlying the contract and from which the contract's value is derived.

Operation of the Invention—Model Option Valuation Tool Using a Binomial Approach FIG. 3 shows how the formula illustrated in FIG. 2 could be embodied in a Microsoft Excel worksheet and used to calculate theoretically correct values for a Model Option contract with a common stock as the asset underlying the contract and from which the contract's value is derived. It also demonstrates how a person with limited knowledge of option valuation could use this worksheet to develop theoretically accurate values for this type of Model Option contract. This computer program accompanies this specification in the form of a CD ROM and can be implemented by inputting values into it.

Beginning at the top of FIG. 3, the user specifies from the menu that the Model Option is a call option with American style exercise features.

In Block 1, the user inputs values that will be used by this Model Option pricing method. The asset price, strike price, time to maturity, risk-free interest rate, cost of carry, volatility, and the number of time steps are standard input values that any user of binomial option valuation models would be familiar with.

Based on the inputs in Block 1, the computer calculates the value of a traditional option ("the traditional option value component") using a binomial pricing method. This value is shown in Block 2. In this case, the theoretically correct value of a Model Option contract assuming there was no settlement right would be $5.0249 based on this option pricing model.

In Block 3, the user inputs values that are specified in the Model Option contract that will be used to generate the settlement price. These values include the specified risk-free interest rate, the specified cost of carry, and the specified volatility.

Block 4 shows both the settlement price of the Model Option and the theoretical value of the Model Option assuming that the Model Option contract specified that the Bjerksund Stensland Approximation was to be used to determine the settlement price. The calculation determines that the value of the settlement price is $3.0454 and that the theoretical value of the Model Option contract is approximately $5.0254.

Block 5 shows the settlement price of the Model Option and the theoretical value of the Model Option assuming that the Model Option contract specified that the Binomial Model of option valuation was to be used to determine the settlement price. In this case the settlement price would be approximately $3.0951, and the theoretical value of the Model Option would be approximately $5.0254.

Block 6 shows the settlement price of the Model Option contract and the theoretical value of the Model Option assuming that the Model Option contract specified that the Generalized Black and Scholes Model of option valuation was to be used to determine the settlement price of the Model Option contract. In this case, the settlement price would be approximately $3.0045, and the value of the Model Option would be approximately $5.0254.

There are many different option valuation models that might be specified in a Model Option contract to generate a settlement price. This computer program only demonstrates three of the more popular methods of traditional option valuation and shows how they would be used in conjunction with the present method to determine the theoretically correct value of a Model Option contract using a binomial lattice as described by the mathematical formula shown in FIG. 2.

Each of the settlement values shown in blocks four, five, and six of FIG. 3 are different despite the fact that they have the same input values because they were calculated using different option valuation models. These alternative valuations are shown for illustrative purposes only.

In actual usage, one would use the option pricing model specified in the Model Option contract to determine the settlement price and this price would be used to determine the value of the Model Option. Many other option pricing models could be used to determine the settlement price in addition to the ones shown in this illustration.

In the example presented in FIG. 3, there is only a little difference between the value of the Model Option contract and the traditional option value. Also the value of the Model Option contract is equivalent in blocks four, five and six. This is because the value of the settlement right of the Model Option is significantly less than the traditional option value, in this example. This is not a feature of all Model Option contracts. Nevertheless, the Model Option contract is still worth slightly more than the traditional option value shown in Block 2 because there are one or more nodes in the binomial tree where the settlement price is greater than the traditional option value.

Based on this information, an option holder would prefer to keep the Model Option contract or to exchange it with a third party than to settle the contract for the settlement price, since the value of the Model Option contract is much greater than its settlement right.

Option Pricing Model for a Model Option Contract Using a Trinomial Approach

A mathematical formula that implements the method described in FIG. 1 using a trinomial approach is shown in FIGS. 4a and 4b. This formula can be used to calculate a theoretically correct value for a Model Option contract with a common stock as the asset underlying the contract and from which the contract's value is derived.

Additional Embodiments

The mathematical model illustrated in FIG. 2 and demonstrated in FIG. 3 and the mathematical model illustrated in FIGS. 4a and 4b are only two embodiments of the method shown in FIG. 1. This general method could employ any theoretically correct lattice approach to compute a theoretically correct value for a Model Option contract.

CONCLUSION, RAMIFICATIONS, AND SCOPE OF INVENTION

From the description above it should be clear that this method of valuing a Model Option contract is theoretically correct and easy to implement. It can be used to help people understand how to construct Model Option contracts to best serve their purposes, and it can be used to value these contracts once they are in use. This method is very important for most companies that use Model Option contracts since they must show theoretically accurate values in their books and records of their Model Options positions.

This method can also be used to manage the risk associated with Model Option contracts and to help the user determine the best time and ways of capturing the value of these contracts.

Although the description above contains certain specifics, these should not be construed as limiting the scope of the invention but as merely providing illustrations of some of the presently preferred embodiments of this invention. This methodology can be applied in many ways to all types of Model Option contracts. Thus the scope of the invention should be determined by the appended claims and the legal equivalents, rather than by any particular example described above.

We claim:

1. An information system operative for calculating a theoretically correct value for a Model Option contract, comprising:

a data storage device configured to store information pertaining to the Model Option contract, an option contract that confers a contractual right that enables the option contract's holder to force delivery of a cash settlement price that is determined by using a specified valuation methodology that is described in the option contract, the specified valuation methodology including a description of an option pricing model and input values to be used to run the option pricing model;

a computer linked to the data storage device configured to:

receive and store in the data storage device the option pricing model specified in the specified valuation methodology of the Model Option contract;

receive and store in the data storage device the input values to run the option pricing model as described in the specified valuation methodology of the Model Option contract; and calculate the theoretically correct value for the Model Option contract by performing the steps of:
a. constructing a lattice of possible underlying asset prices to the expiration of said option contract;
b. calculating an intrinsic value at each node of said lattice;
c. calculating a settlement price at each said node by implementing the Model Option contract's specified valuation methodology;

d. selecting said intrinsic value at each ultimate node as an ultimate nodal value;
e. backwardly inducing from each said ultimate nodal value a provisional penultimate nodal value at each penultimate node;
f. selecting the greater of said provisional penultimate nodal value, said intrinsic value, or said settlement price at each said penultimate node as a nodal value for each said penultimate node;
g. backwardly inducing a provisional nodal value for each previous node in said lattice from each succeeding node's nodal value and selecting the greater of said provisional nodal value, said intrinsic value, or said settlement price at each said previous node as said previous node's nodal value;
h. continuing this process until a nodal value has been determined for each node in said lattice;
i. selecting said lattice's first nodal value as said theoretically correct value for the Model Option contract; and
j. processing the above steps by using the algorithm $$P_{j,i} = \text{Max}\left\{VM^*[Z, S_{j,i} \cdot X, (n-j)T/n.r^* \cdot b^* \cdot \sigma^*], \left[\sum_{k=0}^{m-1} p_k \cdot P_{j+1,i+k}\right]e^{-rTn}, Z(S_{j,i}-X)\right\}$$

where:
* denotes that a parameter is specified in the contract for use in determining the Model Option Contract's settlement price;
VM* is the specified option pricing model that is used to determine the settlement price;
Z equals 1 for calls and −1 for puts;
$S_{j,i}$ is the stock price for each node of a multinomial tree and is equal to $$S \cdot u^{2(i-\frac{2}{2}(m-1)\cdot j)};$$

S is the current stock price which is also denoted as $S_{0,0}$;
X is the strike price;
n is the number of time steps in the tree;
j is an index that indicates the position of each node on the multinomial tree with respect to the option's expiration and runs from a value of 0 at the beginning of the tree to n;
i is an index that indicates the position of each node on the multinomial tree with respect to a particular value of j and runs from zero to j·(m −1);
T is the time to expiration date of the option contract;
r is the risk-free interest rate;
r* is the specified risk-free interest rate used to determine the Model Option's settlement price;
b is the cost of carry (r−dividend rate on S);
b* is the specified cost-of-carry used to determine the settlement price;
σ is the volatility of the relative price change of the underlying stock price;
σ* is the specified volatility used to determine the Model Option's settlement price;
m is the number of branches at each node of the tree;
k is an index that indicates each of the m branches at a given node that runs from zero to (m−1);
$P_{j,i}$ the option value at the j, i node of the tree and $P_{0,0}$ is the option value on the valuation date; and
$p_k$ is the transition probability from node (j, i) to node (j+1, i+k) and is equal to $$\frac{(m-1)!}{k!(m-1-k)!} \cdot up^k \cdot (1-up)^{(m-1-k)};$$

up defines the probability of jump u and is equal to $$\frac{e^{\frac{b \cdot T}{(m-1) \cdot n}} - u^{-1}}{u - u^{-1}}; \text{ and}$$

u is equal to $$e^{\sigma} \cdot \sqrt{\frac{T}{n \cdot (m-1)}}.$$

2. The information system of claim 1, wherein the computer uses said algorithm to construct a binomial lattice to calculate said theoretically correct value for the Model Option contract where the value of m is equal to 2.

3. The information system of claim 1, wherein the computer uses said algorithm to construct a trinomial lattice to calculate said theoretically correct value for the Model Option contract where the value of m is equal to 3.

4. A computer-implemented method operative for calculating a theoretically correct value for a Model Option contract, comprising the steps of:
receiving and storing in a data storage device information pertaining to the Model Option contract, an option contract that confers a contractual right that enables the option contract's holder to force delivery of a cash settlement price that is determined by using a specified valuation methodology that is described in the option contract, the specified valuation methodology including a description of an option pricing model and input values to be used to run the option pricing model;
receiving and storing in the data storage device the option pricing model specified in the specified valuation methodology of the Model Option contract;
receiving and storing in the data storage device the input values to be used to run the option pricing model as described in the specified valuation methodology of the Model Option contract; and
a computer linked to the data storage device calculating the theoretically correct value for the Model Option contract by performing the steps of:
a. constructing a lattice of possible underlying asset prices to the expiration of said option contract;
b. calculating an intrinsic value at each node of said lattice;
c. calculating a settlement price at each said node by implementing the Model Option contract's specified valuation methodology;
d. selecting said intrinsic value at each ultimate node as an ultimate nodal value;
e. backwardly inducing from each said ultimate nodal value a provisional penultimate nodal value at each penultimate node;

f. selecting the greater of said provisional penultimate nodal value, said intrinsic value, or said settlement price at each said penultimate node as a nodal value for each said penultimate node;
g. backwardly inducing a provisional nodal value for each previous node in said lattice from each succeeding node's nodal value and selecting the greater of said provisional nodal value, said intrinsic value, or said settlement price at each said previous node as said previous node's nodal value;
h. continuing this process until a nodal value has been determined for each node in said lattice;
i. selecting said lattice's first nodal value as said theoretically correct value for the Model Option contract; and
j. processing the above steps by using the algorithm $$P_{j,i} = \text{Max}\left\{ VM^*[Z.S_{j,i}.X.(n-j)T/n.r^* \cdot b^* \cdot \sigma^*], \left[\sum_{k=0}^{m-1} p_k \cdot P_{j+1,i+k}\right]e^{-rTn}, \right.$$
$$\left. Z(S_{j,i} - X)\right\}$$

where:
* denotes that a parameter is specified in the contract for use in determining the Model Option Contract's settlement price;
VM* is the specified option pricing model that is used to determine the settlement price;
Z equals 1 for calls and -1 for puts;
$S_{j,i}$ is the stock price for each node of a multinomial tree and is equal to $$S \cdot u^{2\left(i - \frac{1}{2} \cdot (m-1) \cdot j\right)};$$

S is the current stock price which is also denoted as $S_{0,0}$;
X is the strike price;
n is the number of time steps in the tree;
j is an index that indicates the position of each node on the multinomial tree with respect to the option's expiration and runs from a value of 0 at the beginning of the tree to n;
i is an index that indicates the position of each node on the multinomial tree with respect to a particular value of j and runs from zero to j·(m−1);

T is the time to expiration date of the option contract;
r is the risk-free interest rate;
r* is the specified risk-free interest rate used to determine the Model Option's settlement price;
b is the cost of carry (r - dividend rate on S);
b* is the specified cost-of-carry used to determine the settlement price;
σ is the volatility of the relative price change of the underlying stock price;
σ* is the specified volatility used to determine the Model Option's settlement price;
m is the number of branches at each node of the tree;
k is an index that indicates each of the m branches at a given node that runs from zero to (m−1);
$P_{j,i}$ is the option value at the j, i node of the tree and $P_{0,0}$ is the option value on the valuation date; and
$p_k$ is the transition probability from node (j, i) to node (j+1, i+k) and is equal to $$\frac{(m-1)!}{k!(m-1-k)!} \cdot up^k \cdot (1-up)^{(m-1-k)};$$

up defines the probability of jump u and is equal to $$\frac{e^{\frac{b \cdot T}{(m-1) \cdot n}} - u^{-1}}{u - u^{-1}}; \text{ and}$$

u is equal to e $$e^{\sigma} \cdot \sqrt{\frac{T}{n \cdot (m-1)}}.$$

5. The computer-implemented method of claim 4, wherein the computer uses a binomial lattice to calculate said theoretically correct value for the Model Option contract by using said algorithm where the value of m is equal to 2.

6. The computer-implemented method claim 4, wherein the computer uses a trinomial lattice to calculate said theoretically correct value for the Model Option contract using said algorithm where the value of m is equal to 3.

* * * * *